United States Patent [19]

Hansen

[11] Patent Number: 5,361,073
[45] Date of Patent: Nov. 1, 1994

[54] DETERMINATION OF JAMMER RANGE AND AZIMUTH BY USE OF A COHERENT SIDE LOBE CANCELLER SYSTEM

[75] Inventor: James P. Hansen, Waldorf, Md.

[73] Assignee: The United States of America as represented by the Secretary of the Navy, Washington, D.C.

[21] Appl. No.: 589,951

[22] Filed: Jun. 26, 1975

[51] Int. Cl.⁵ .......................... G01S 3/16; G01S 3/28
[52] U.S. Cl. .................................... 342/381
[58] Field of Search ........ 343/100 LE, 112 D, 113 R; 342/381, 384

*Primary Examiner*—Theodore M. Blum
*Attorney, Agent, or Firm*—Thomas E. McDonnell

[57] ABSTRACT

An improved countermeasure detection system and technique for determining the range and azimuth of a noise jammer in a radar environment. A signal limiter is inserted into the output loops of a conventional multi-loop side-lobe canceller system such that the loops only respond to interference signals in the main lobe of a radar antenna as it sweeps through the jamming source. Each of the loops develops a weighting signal that is a measure of the absolute phase of the interference signal at an auxiliary antenna with respect to the phase center of the main radar antenna. By using two or more weighting signals and the known placement of each auxiliary antenna relative to the main radar antenna, the range and azimuth of a jammer can be calculated using available processing equipment to solve simultaneous equations.

4 Claims, 2 Drawing Sheets

DETERMINATION OF JAMMER RANGE AND AZIMUTH BY USE OF A COHERENT SIDE LOBE CANCELLER SYSTEM

BACKGROUND OF THE INVENTION

The present invention relates to counter countermeasure systems and more particularly to improved techniques for determining the range and direction of an interference source.

One of the most common techniques for disrupting a tracking radar system is to provide a noise jammer to produce interference at the frequency of the tracking radar to prevent information retrieval from the radar signal. This technique is particularly effective when the radar frequency is known or can be approximated because of conditions or environment which dictate the use of specific radar frequencies. While such jamming techniques can in some instances be substantially overcome by using different frequencies or sophisticated cancelling equipment, it is sometimes desirable to be able to simultaneously locate the position of the jammer to enable jammer destruction or provide information as to enemy position and deployment.

One such prior method for determining jammer position has utilized a special directional auxiliary antenna mounted to the main radar antenna of a tracking radar. A special loop is then used to determine signal phase as the radar tracks the jammer, which together with the pointing angles of the antennas, allows a jammer position determination. This technique requires the special directional auxiliary antenna and is limited in accuracy by the distance restriction fixed by mounting the directional antenna onto the radar antenna. In addition, a special loop is required to develope the phase signal necessary for position determination.

Other prior known techniques have used the conventional triangulation approach where the electromagnetic interference radiation is detected by several directional detectors located at various stations or in multiple vehicles separated by relatively large distances. By knowing the distance between the stations or the vehicles and the direction of the jammer from each position, the range and therefore position of the jammer, can easily be calculated. While this technique is relatively successful, the distance between stations must be precisely known and continuously monitored, and the direction information must be transmitted between stations. Such conditions require constant information exchange between plural stations, particularly for moving vehicles, and subject the stations to enemy detection that might otherwise be concealed.

Accordingly, the present invention has been developed to overcome the specific shortcomings of the above known and similar techniques and to provide a relatively simple and reliable technique for determining range and azimuth of an interference source.

SUMMARY OF THE INVENTION

It is therefore an object of the present invention to provide a system and technique for determining range and azimuth of an interference source with existing systems.

Another object of the invention is to provide a technique for determining interference source position that reduces the probability of its detection.

A further object of the invention is to provide a range and azimuth measuring system that uses available information in a multi-loop side-lobe canceller system.

Still another object of the invention is to provide a system and technique that allows both interference cancellation and interference source position determination from a single station and with only minor modifications to existing structures.

Yet another object of the invention is to eliminate the need for special antennas, multiple stations, or additional loops to determine jammer position.

In order to accomplish these and other objects, the present invention provides a limiter for modifying a conventional multi-loop coherent side-lobe canceller system so that the system only responds to interference signals in the main lobe of the radar as the main lobe sweeps through the jammer. Each of the plurality of loops associated with plural auxiliary omnidirectional antennas developes a weighting signal that is a measure of the absolute phase of the interference signal at the auxiliary antenna with respect to the phase center of the main radar antenna. By switching in the limiter and coupling the weighting signal outputs to corresponding phase detectors, a plurality of absolute phase measurements can be coupled, along with the corresponding physical parameters defining auxiliary and main antenna positions, to an on site data processing unit for calculation and display of jammer range and azimuth. In this manner, the system can be used to cancel interference during radar operation while providing easy and reliable position information about the jammer source. Since all information and apparatus are contained at a single station position determination is greatly reduced in complexity while reducing the possibility of enemy detection. In addition, the system provides increased accuracy over some prior methods by providing more auxiliary antenna information and greater physical separation of the auxiliary antennas.

Other objects, advantages, and novel features of the invention will become apparent from the following detailed description of the invention when considered with the accompanying drawing wherein:

DETAILED DESCRIPTION OF A PREFERRED EMBODIMENT

Figure 1:
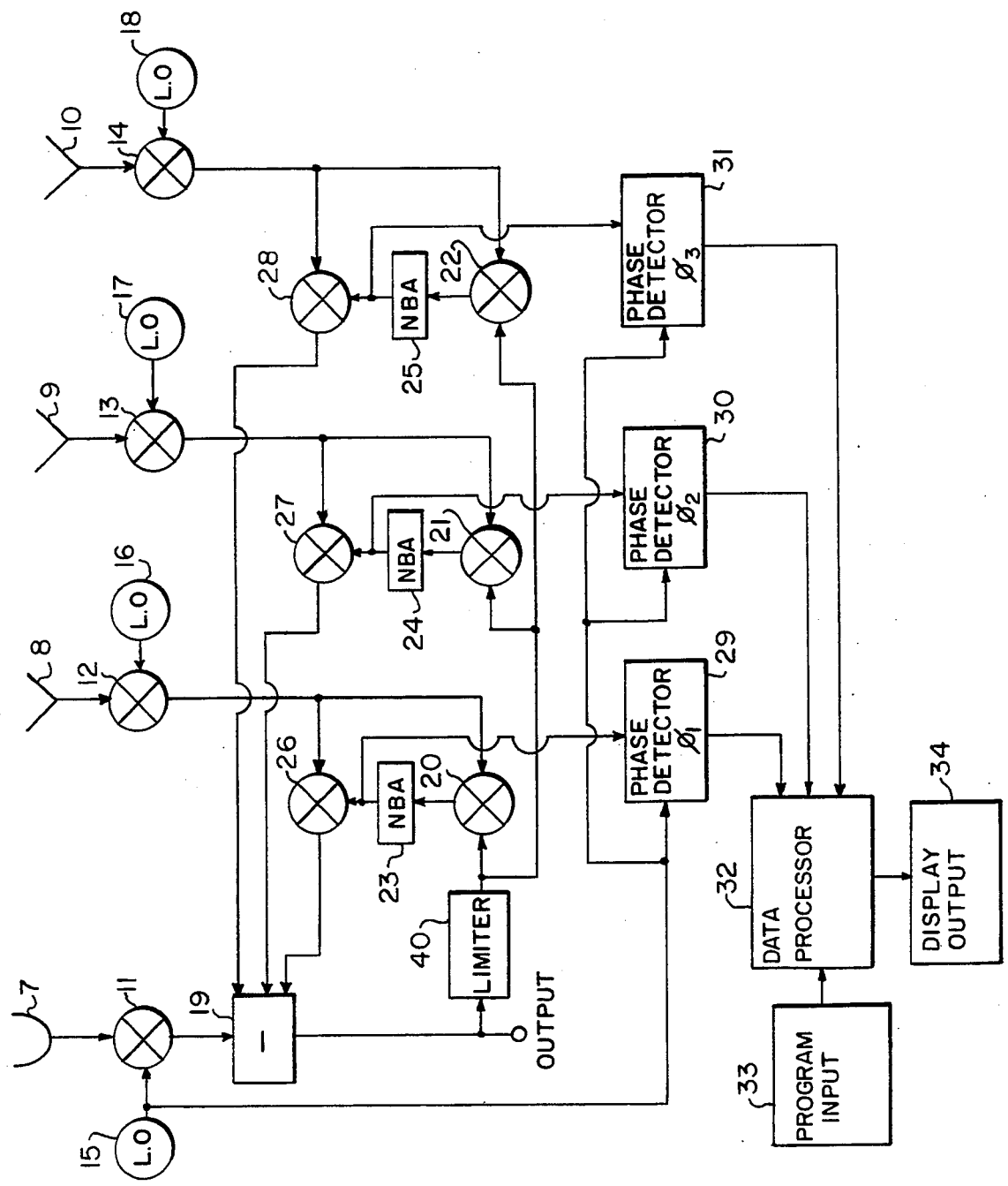
FIG. 1 is a schematic diagram of the system for determining interference source position according to the present invention.

Referring now to FIG. 1, a schematic diagram shows a preferred embodiment of the modified side-lobe canceller system for determining jammer position according to the present invention. In the present example, a conventional multi-loop coherent side-lobe canceller system is represented by elements 7–28. The theory behind the operation of such a prior art system is generally taught by U.S. Pat. No. 3,202,990, reference to which is hereby made, and will not be discussed in great detail. Generally, however, the system is comprised of a main receiving channel in the form of a directional radar antenna 7 and a plurality of auxiliary receiving channels in the form of omnidirectional antennas 8–10. While only three auxiliary antennas are shown, it is usual practice to employ a plurality of auxiliary antennas generally lying in the same horizontal plane and spaced in azimuth about the main radar antenna 7 (see FIG. 2). The output from 7 is mixed with the output from local oscillator 15 in a mixer 11, down to an intermediate frequency (IF), to produce an output coupled to subtractor 19. In the same manner, the outputs from auxiliary antennas 8–10 are mixed with the outputs of their respective local oscillators 16–18 in mixers 12–14 down to an intermediate frequency offset from the frequency of the main channel. While the use of separate local oscillators has been described, it is obvious that other techniques of obtaining the desired intermediate frequency may be employed such as by using a single local oscillator for all channels and then offsetting the frequency of the auxiliary channels. The output from mixer 11 is coupled as one input to subtractor 19 whose output in turn is coupled (through band pass filters not shown) as one input to each of the plurality of mixers 20–22. At the same time, the outputs from mixers 12–14 are coupled (through band pass filters not shown) as a second input to each of the mixers 20–22 respectively. The output from each of the mixers 20–22 is then coupled, in turn, to a respective one of the narrow band amplifiers 23–25. Each of the outputs from narrow band amplifiers 23–25 is then coupled along with a corresponding output from one of the mixers 12–14 as inputs to one of the mixers 26–28, with the outputs from mixers 26–28 being coupled as inputs to the subtractor 19 to complete the canceller loop where they are subtracted from the main radar signal from 11.

According to the conventional operation as a side-lobe canceller system, the interference signal received by the main radar antenna is a carrier signal at the radar frequency modulated by the jammer waveform. The expression defining the interference signal received in each of the auxiliary antennas is the same as the expression defining the jamming signal received in the main radar antenna except for a gain difference and a phase shift introduced by the difference in path length from the jammer to each auxiliary antenna and from the jammer to the radar antenna, with the magnitude of the phase shift depending on the position of the jammer and the distance between each auxiliary antenna and the radar antenna. As is known, the mixers 20–22 and narrow band amplifiers 23–25 act as correlators to produce wieghting signals. For the simple case of a single interference source the weighting signal amplitudes are proportional to average jammer power and their phase is equal to the phase of the interference signal received at the particular auxiliary antenna with respect to the main antenna. Each weighting signal is used to phase shift and amplitude weight the interference signal received by the mixers 26–28 from mixers 12–14 in order to match the phase and amplitude of the interference signal received by the main radar antenna so they can be subtracted at 19 from the main channel signal to cancel interference.

While the above system is effective for cancelling interference, it does not provide any information or indication of jammer position that might be useful in overcoming such interference. According to the present invention, therefore, it is noted that the weighting signal from each narrow band amplifier 23–25 gives a direct measure of the phase difference between the interference signal received at the phase center of the main radar antenna and at each auxiliary antenna. A limiter 40 is therefore inserted into the canceller system between the subtractor output and the input to mixers 20–22 to insure that the system only responds to interference signals in the main lobe as the main lobe sweeps through the jammer. In practice, a switch (not shown) can be used to insert the limiter for operation according to the present invention or by pass the limiter for operation as a conventional side-lobe canceller. The weighting signal outputs from 23–25 are coupled to respective phase detectors 29–31 along with an input from local oscillator 15 to produce outputs $\phi_1$, $\phi_2$ and $\phi_3$ representing the absolute phase of the interference signal at each auxiliary antenna with respect to the interference signal at the phase center of the radar antenna. These outputs $\phi_1$, $\phi_2$ and $\phi_3$ are then fed to data processor 32, along with the parameters defining the geometrical relationship between the main and auxiliary antennas from program input 33, to calculate jammer range and azimuth by solving simultaneous equations. The output can then be displayed at 34 in any desirable manner. The data processor 32 can be any analog or digital computer available at the canceller site for processing information and can be of any conventional construction capable of solving simultaneous equations for a plurality of unknowns. The program input 33 can likewise be of conventional construction that will vary with the processor 32 to provide the necessary parameters defining antenna geometry in the appropriate format and initiate the programming for solving the equations. In a like manner, the display 34 output can be any known digital or analog device capable of displaying the solutions (e.g. numerical digital display) for range and azimuth provided by 32.

Figure 2:
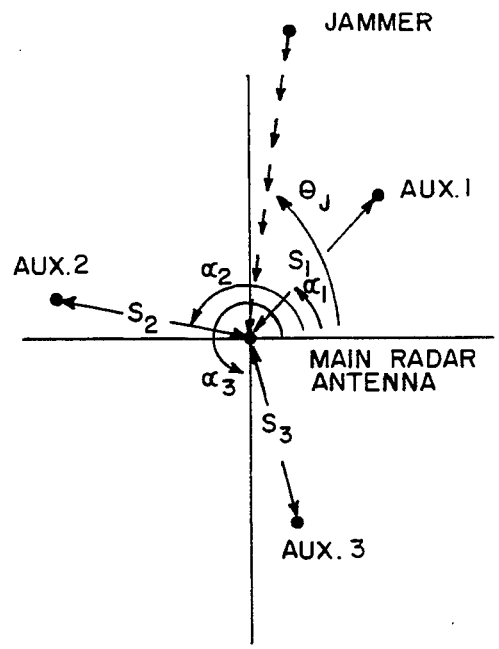
FIG. 2 is a diagram showing the relative azimuth positions of the main and auxiliary antennas in a system according to FIG. 1.
Figure 3:
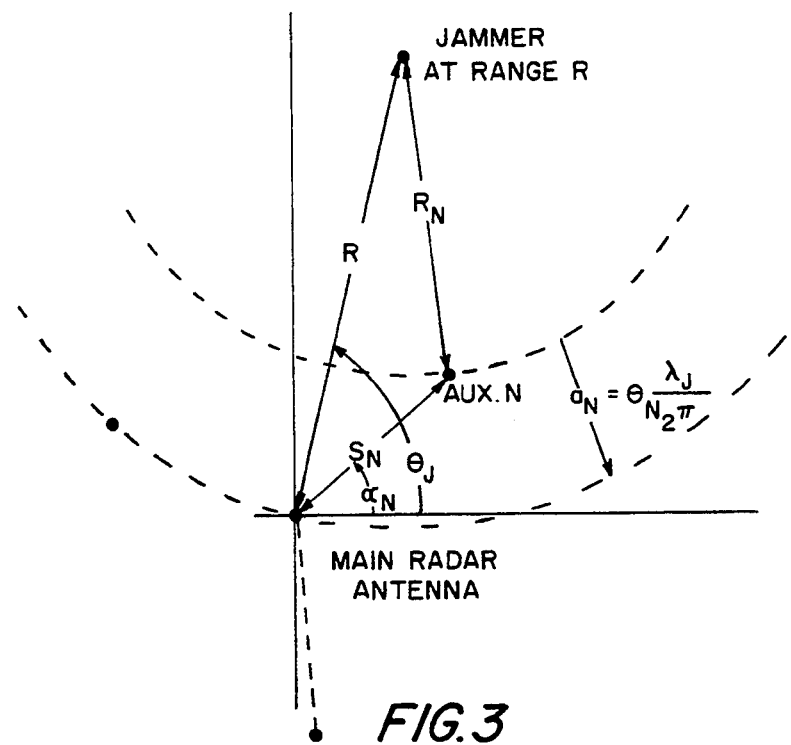
FIG. 3 is a diagram showing the angles and path dimensions for determining range and azimuth with the system of FIG. 1.

The operation of the inventive system will now be described with particular reference to FIGS. 2 and 3. FIG. 2 specifically shows a configuration of three auxiliary antennas symmetrically arranged in azimuth around the main radar antenna at fixed points not located on the radar antenna. For best operation and accuracy, the distance between each auxiliary and the main antenna should be maintained as great as possible while still consistent with the operation of the system as a coherent side-lobe canceller. A reference coordinate system is defined which establishes the angle of jammer attack as $\theta_j$ and each of the angles $\alpha_1$, $\alpha_2$ and $\alpha_3$ as the auxiliary antenna angles from the same reference point. Given a multiple antenna side-lobe canceller system with a jammer at range R, an equation defining the range in terms of the phases $\phi_1, \phi_2, \phi_3 \ldots \phi_N$ for N auxiliary antennas where N = 1, 2, 3 ... can be generally derived using known trigonometric relationships by reference to FIG. 3.

Let $S_N$ be the arm length from the main antenna to the $N^{th}$ auxiliary antenna, $R_N$ be the distance from that same auxiliary antenna to the jammer, $\phi_N$ be the absolute phase change occurring in the interference signal as it propogates between the auxiliary antenna and the main radar antenna, and $a_N$ be the distance travelled by the phase front as it passes between the auxiliary antenna and main antenna where $$a_N = \phi_N \frac{\lambda}{2\pi}$$

and $\lambda$ is equal to the jammer wavelength; then, by the law of cosines, $$R_N^2 = S_N^2 + R^2 - 2RS_N \cos(\theta_J - \alpha_N),$$

and by substituting $$R_N = \left(R - \phi_N \frac{\lambda}{2\pi}\right),$$

yields $$\left(R - \phi_N \frac{\lambda}{2\pi}\right)^2 = S_N^2 + R^2 - 2RS_N \cos(\theta_J - \alpha_N).$$

Solving for R in a general range equation yields $$R^2 - 2R\left(\phi_N \frac{\lambda}{2\pi}\right) + \left(\phi_N \frac{\lambda}{2\pi}\right)^2 =$$
$$S_N^2 + R^2 - 2RS_N \cos(\theta_J - \alpha_N).$$

and $$R = \frac{S_N^2 - \left(\phi_N \frac{\lambda}{2\pi}\right)^2}{2\left[S_N \cos(\theta_J - \alpha_N) - \left(\phi_N \frac{\lambda}{2\pi}\right)\right]}$$

which reduces to $$R = \frac{S_N^2 - a_N^2}{2[S_N \cos(\theta_J - \alpha_N) - a_N]}. \tag{1}$$

Given two independent phase measurements $\phi_1, \phi_2, \ldots \phi_N$ from the detectors of FIG. 1, and the values of $S_1, S_2, \ldots S_N$ and $\alpha_1, \alpha_2, \ldots \alpha_N$ as provided by the program input 33, the data processor can operate to solve two simultaneous equations for the unknowns of range R and azimuth $\theta_J$. The equations using $\phi_1$ and $\phi_2$ would be $$R = \frac{S_1^2 - \left(\theta_1 \frac{\lambda}{2\pi}\right)^2}{2\left[S_1 \cos(\theta_J - \alpha_1) - \left(\phi_1 \frac{\lambda}{2\pi}\right)\right]} \tag{2}$$

$$R = \frac{S_2^2 - \left(\phi_1 \frac{\lambda}{2\pi}\right)^2}{2\left[S_2 \cos(\theta_J - \alpha_2) - \phi_2 \frac{\lambda}{2\pi}\right]} \tag{3}$$

If $$\phi_N \frac{\lambda}{2\pi} = a_N \text{ and } (S_N^2 - a_N^2) = D_N$$

then substituting in (2) and (3) yields $$R = \frac{D_1}{2[S_1 \cos(\theta_J - \alpha_1) - a_1]} \tag{4}$$

$$R = \frac{D_2}{2[S_2 \cos(\theta_J - \alpha_2) - a_2]} \tag{5}$$

This can be expanded by setting (4) equal to (5) where $$D_1 S_2 \cos(\theta_j - \alpha_2) - D_1 a_2 = D_2 S_1 \cos(\theta_J - \alpha_1) - D_2 a_1. \tag{6}$$

and solving for $\cos(\theta_J - \alpha_1)$ which yields $$\cos(\theta_J - \alpha_1) = \frac{D_1 S_2}{D_2 S_1} \cos(\theta_J - \alpha_2) + \frac{D_2 a_1 - D_1 a_2}{D_2 S_1}. \tag{7}$$

Now let $$\frac{D_1 S_2}{D_2 S_1} = P \text{ and } \frac{D_2 a_1 - D_1 a_2}{D_2 S_1} = Q$$

and substitute into (7) to get $$\text{con}(\theta_J \alpha_1) = P \cos(\theta_J \alpha_2) + Q. \tag{8}$$

Using the identity $$\cos(\theta_J - \alpha_N) = A_N \cos\theta_J + B_N \sin\theta_J$$

where $A_N = \cos\alpha_N$ and $B_N = \sin\alpha_N$, then $$\cos(\theta_J - \alpha_1) = A_1 \cos\theta_J + B_1 \sin\theta_J \text{ and} \tag{9}$$

$$\cos(\theta_J - \alpha_2) = A_2 \cos\theta_J + B_2 \sin\theta_J. \tag{10}$$

Setting (8) equal to (9) and substituting (10) for $\cos(\theta_J - \alpha_2)$ yields $$A_1 \cos\theta_J + B_1 \sin\theta_J PA_2 \cos\theta_J + PB_2 \sin\theta_J + Q. \tag{11}$$

Now using the identity $\sin\theta_J = (1 - \cos^2\theta_J)^{\frac{1}{2}}$ and substituting in (11) and transposing yields $$0 = -(A_1 - PA_2)\cos\theta_J - (B_1 PB_2)(1 - \cos^2\theta_J)^{\frac{1}{2}} Q. \tag{12}$$

Now let $A_1 - PA_2 = V$ and $B_1 - PB_2 = W$ then $$0 = (V^2 + W^2)\cos^2\theta_J - 2QV\cos\theta_J + (Q^2 - W^2). \tag{13}$$

Solving for $\cos\theta_J$ yields $$\cos\theta_J = \frac{QV \pm W\sqrt{V^2 + W^2 - Q^2}}{V^2 + W^2} \tag{14}$$

Now substituting back for V, W, $A_N$ and $B_N$ yields $$\theta_J = \cos^{-1}\left[\frac{Q(\cos\alpha_1 - P\cos\alpha_2) \pm (\sin\alpha_1 - P\sin\alpha_2)\sqrt{1 - 2P\cos(\alpha_1 - \alpha_2) + P^2 - Q^2}}{1 - 2P\cos(\alpha_1 - \alpha_2) + P^2}\right] \tag{15}$$

where $$P = \frac{\left[S_1^2 - \left(\phi_1 \frac{\lambda}{2\pi}\right)^2\right] S_2}{\left[S_2^2 - \left(\phi_2 \frac{\lambda}{2\pi}\right)^2\right] S_1}$$

and $$Q = \frac{\left[S_2^2 - \left(\phi_2 \frac{\lambda}{2\pi}\right)^2\right]\left(\phi_1 \frac{\lambda}{2\pi}\right) - \left[S_1^2 - \left(\phi_1 \frac{\lambda}{2\pi}\right)^2\right]\left(\phi_2 \frac{\lambda}{2\pi}\right)}{\left[S_2^2 - \left(\phi_2 \frac{\lambda}{2\pi}\right)^2\right] S_1}$$

As can be seen, by solving two simultaneous equations for $\phi_1$ and $\phi_2$, the jammer range and azimuth R and $\theta_j$ can be calculated by 32 and displayed by 34. Additional calculations can be made using any two phase values $\phi_1$ and $\phi_2 \ldots \phi_N$ to further check the accuracy of any calculation. With only minor changes, therefore, the multi-loop side-lobe canceller has been modified to form a system also capable of calculating jammer position. By using the present invention, the triangulation arm length is only limited to the extent of the auxiliary antenna configuration which provides sufficient spacing for accurate measurements. This system can be used to determine range and azimuth independent of other indicators or as a check against other systems in a countermeasure environment. In addition, the inventive system eliminates the need for multiple stations or vehicles and reduces the probability of presence detection by enemy installations. The system may further be implemented to give successive calculations of range and azimuth to indicate whether the jammer is stationary or moving toward or away from the radar within a specifice range area. All of this can be accomplished without the need for special directional antennas or additional phase detection constituting an advantage over prior known techniques.

While the limiter 40 has only been generally described, the limiting device could be one or several different structures. A baseline limiter, designed to pass only signals above a threshold level, could be used so that only signals from the main lobe cause the loops to respond. In a like manner an attenuator could also be used to suppress any lower signal level side-lobe signals such that only main lobe signals are passed to the loops.

Obviously many other modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. An interference cancellation and position detection apparatus comprising:
   a directional antenna for receiving an interference signal and providing a main channel output;
   a plurality of auxiliary channels, spaced in azimuth in the same horizontal plane, for receiving the interference signal and providing auxiliary channel outputs;
   subtractor means coupled to subtract a plurality of inputs from said main channel output and provide a subtractor output;
   a plurality of canceller means coupled to said subtractor output and each of said auxiliary channel outputs for developing weighting signals which phase shift and amplitude weight each auxiliary output to correlate the main and auxiliary channel outputs, each of said weighted auxiliary channel outputs being coupled to form one of said plurality of subtractor inputs for cancelling interference in said main channel output;
   means for inserting a limiter in series with the output of said subtractor such that the canceller means only respond to main lobe interference signals;
   means coupled to receive at least two of said weighting signals for detecting the phase of the interference signal at the corresponding auxiliary channel relative to the interference signal at the directional antenna; and
   means responsive to said detecting means for calculating the range and azimuth of the source providing said interference signal.

2. The system of claim 1 wherein said means for calculating comprises:
   means for storing the interference source wavelength and the distance and azimuth angles of said auxiliary channels relative to said directional antenna in a given coordinate reference; and
   means responsive to said storing means and to staid at least two phases from said detector means for solving two simultaneous equations for range and azimuth.

3. The system of claim 2 wherein each of said auxiliary channels includes an omnidirectional antenna.

4. A method of determining the range and azimuth of an interference source with a multi-loop side-lobe canceller comprising:
   receiving interference from a source at a given frequency in a main antenna and a plurality of auxiliary antennas of a multi-loop side-lobe canceller;
   inserting a limiter into the plural canceller loops such that the canceller only responds to interference received in the main lobe of the main antenna;
   sensing the weighting signals of at least two loops to detect the phase of the interference signal at at least two auxiliary antennas relative to the interference signal at the phase center of the main antenna;
   providing a coordinate reference which fixes the distance and azimuth angles of each auxiliary antenna relative to the main antenna in substantially the same horizontal plane; and
   substituting the detected values for phase, the provided values of distance and azimuth angles, and the wavelength of the interference source, into two simultaneous equations to solve for the range and azimuth of the interference source.

* * * * *